(12) United States Patent
Yang et al.

(10) Patent No.: US 11,676,161 B2
(45) Date of Patent: Jun. 13, 2023

(54) COMBINED LIGHT AND HEAVY MODELS FOR IMAGE FILTERING

(71) Applicant: NEC Laboratories America, Inc., Princeton, NJ (US)

(72) Inventors: Yi Yang, Princeton, NJ (US); Min Feng, Monmouth, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 17/181,735

(22) Filed: Feb. 22, 2021

(65) Prior Publication Data
US 2021/0264138 A1 Aug. 26, 2021

Related U.S. Application Data

(60) Provisional application No. 62/981,054, filed on Feb. 25, 2020.

(51) Int. Cl.
*G06V 40/16* (2022.01)
*G06Q 30/0201* (2023.01)
(Continued)

(52) U.S. Cl.
CPC ....... *G06Q 30/0201* (2013.01); *G06T 7/0014* (2013.01); *G06V 10/764* (2022.01);
(Continued)

(58) Field of Classification Search
CPC ............. G06Q 30/0201; G06V 40/173; G06V 40/179; G06V 10/809; G06V 10/82;
(Continued)

(56) References Cited

U.S. PATENT DOCUMENTS 11,048,973 B1 * 6/2021 Ramanathan ........ G06V 10/774
11,227,122 B1 * 1/2022 Gill .......................... G06N 5/04
(Continued)

OTHER PUBLICATIONS

Dean et al., "Large Scale Distributed Deep Networks", Advances in Neural Information Processing Systems 25 (NIPS 2012), Dec. 2012, pp. 2-11.
(Continued)

*Primary Examiner* — Gabriel I Garcia
(74) *Attorney, Agent, or Firm* — Joseph Kolodka

(57) ABSTRACT

Systems and methods for demographic determination using image recognition. The method includes analyzing an image with a pre-trained lightweight neural network model, where the lightweight neural network model generates a confidence value, and comparing the confidence value to a threshold value to determine if the pre-trained lightweight neural network model is sufficiently accurate. The method further includes analyzing the image with a pre-trained heavyweight neural network model for the confidence value below the threshold value, wherein the pre-trained heavyweight neural network model has above about one million trainable parameters and the pre-trained lightweight neural network model has a number of trainable parameters below one tenth the heavyweight model, and displaying demographic data to a user on a user interface, wherein the user modifies store inventory based on the demographic data.

20 Claims, 5 Drawing Sheets

(51) Int. Cl.
*G06T 7/00* (2017.01)
*G06V 10/764* (2022.01)
*G06V 10/80* (2022.01)
*G06V 10/82* (2022.01)

(52) U.S. Cl.
CPC ............ *G06V 10/809* (2022.01); *G06V 10/82* (2022.01); *G06V 40/173* (2022.01); *G06T 2207/20081* (2013.01); *G06T 2207/20084* (2013.01); *G06T 2207/30201* (2013.01); *G06V 40/179* (2022.01)

(58) Field of Classification Search
CPC ................ G06V 10/764; G06T 7/0014; G06T 2207/200081; G06T 2207/20084; G06T 2207/30201
USPC ........................................................ 382/118
See application file for complete search history.

(56) References Cited

U.S. PATENT DOCUMENTS

| | | | |
|---|---|---|---|
| 2017/0076198 A1* | 3/2017 | Jin | G06N 3/08 |
| 2019/0259384 A1* | 8/2019 | Singh | G06N 3/08 |
| 2021/0089921 A1* | 3/2021 | Aghdasi | G06N 5/04 |
| 2021/0141995 A1* | 5/2021 | Lundgaard | G06F 18/2431 |
| 2021/0374502 A1* | 12/2021 | Roth | G06N 3/08 |

OTHER PUBLICATIONS

Hinton et al., "Distilling the Knowledge in a Neural Network", arXiv:1503.02531v1 [stat.ML] Mar. 9, 2015, pp. 1-9.

* cited by examiner

COMBINED LIGHT AND HEAVY MODELS FOR IMAGE FILTERING

RELATED APPLICATION INFORMATION

This application claims priority to Provisional Application No. 62/981,054, filed on Feb. 25, 2020, incorporated herein by reference in its entirety.

BACKGROUND

Technical Field

The present invention relates to image recognition and more particularly image recognition using a combination of convolutional neural network models.

Description of the Related Art

Convolutional neural networks have been used to perform image recognition.

SUMMARY

According to an aspect of the present invention, a method is provided for demographic determination using image recognition. The method includes analyzing an image with a pre-trained lightweight neural network model, where the lightweight neural network model generates a confidence value, and comparing the confidence value to a threshold value to determine if the pre-trained lightweight neural network model is sufficiently accurate. The method further includes analyzing the image with a pre-trained heavyweight neural network model for the confidence value below the threshold value, wherein the pre-trained heavyweight neural network model has above about one million trainable parameters and the pre-trained lightweight neural network model has a number of trainable parameters below one tenth the heavyweight model, and displaying demographic data to a user on a user interface, wherein the user modifies store inventory based on the demographic data.

According to another aspect of the present invention, a system is provided for demographic determination using image recognition. The system includes a memory, wherein a pre-trained lightweight neural network model and a pre-trained heavyweight neural network model are stored in the memory, and one or more processors configured to execute the pre-trained lightweight neural network model and the pre-trained heavyweight neural network model, wherein the pre-trained heavyweight neural network model has above about one million trainable parameters and the pre-trained lightweight neural network model has a number of trainable parameters below one tenth the heavyweight model, and compare a confidence value generated by the pre-trained lightweight neural network model to a threshold value, wherein the one or more processors are configured to execute the pre-trained heavyweight neural network model if the pre-trained lightweight neural network model is sufficiently accurate. The system further includes a user interface configured to display demographic data to a user, wherein the user modifies store inventory based on the demographic data.

According to yet another aspect of the present invention, a non-transitory computer readable storage medium comprising a computer readable program for demographic determination using image recognition is provided. The non-transitory computer readable storage medium comprising a computer readable program can cause the computer to perform analyzing an image with a pre-trained lightweight neural network model, where the lightweight neural network model generates a confidence value; comparing the confidence value to a threshold value to determine if the pre-trained lightweight neural network model is sufficiently accurate; and analyzing the image with a pre-trained heavyweight neural network model for the confidence value below the threshold value, wherein the pre-trained heavyweight neural network model has above about one million trainable parameters and the pre-trained lightweight neural network model has a number of trainable parameters below one tenth the heavyweight model; and displaying demographic data to a user on a user interface, wherein the user modifies store inventory based on the demographic data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
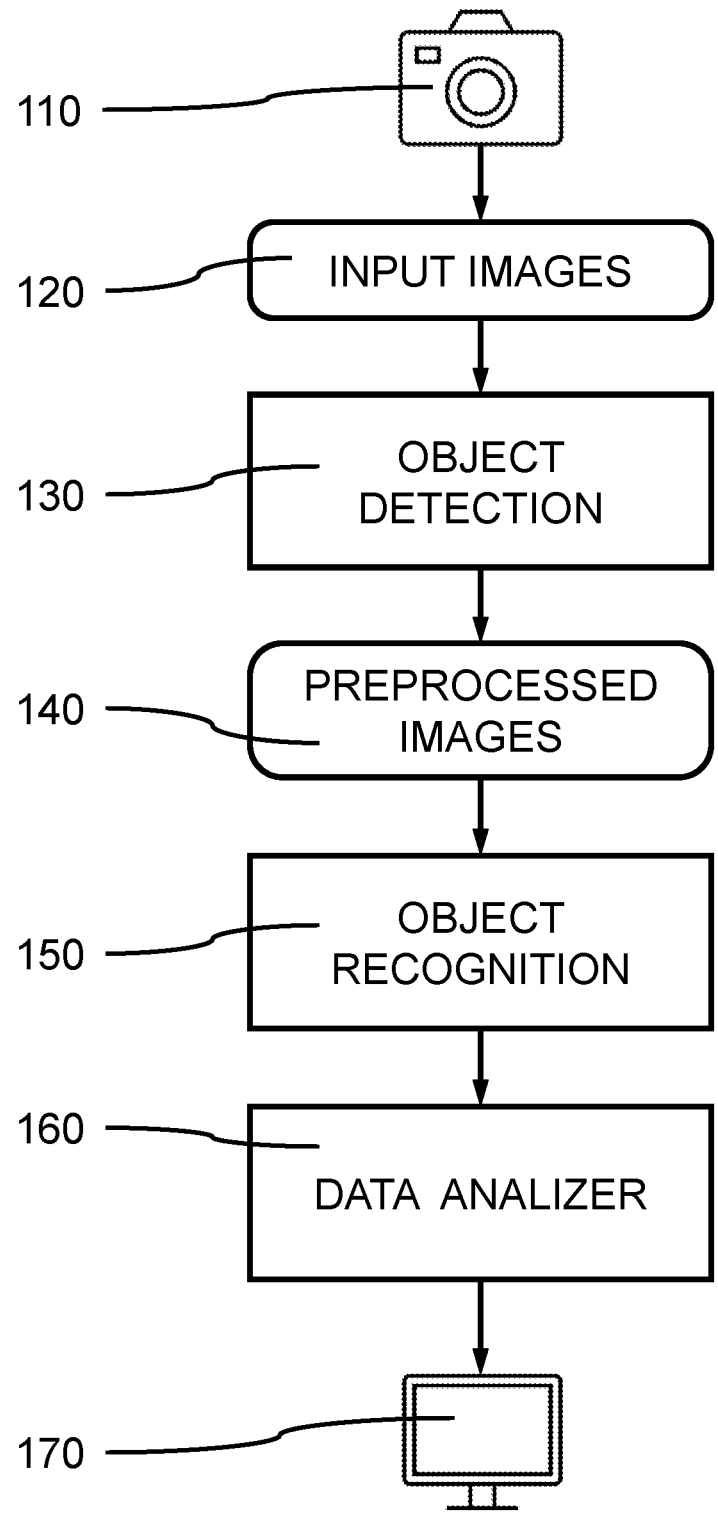
FIG. 1 is a block/flow diagram illustrating a high-level system/method for applying lightweight and heavyweight neural networks to an input as a filtering model, in accordance with one embodiment of the present invention.

In accordance with embodiments of the present invention, systems and methods are provided for image recognition using existing models and a filtering technique to combine advantages of a lightweight and less accurate deep learning model and a heavyweight and more accurate deep learning model. The filtering technique can achieve the execution time similar to the lightweight model and the accuracy similar to the heavyweight model by combining implementation of the two models.

Knowledge distilling can be used to train a small model for faster execution from a large model. In various embodiments, by using existing models, the additional training process and added hardware for better performance can be avoided. Existing deep learning models can be used, so the filtering model doesn't require the training data and additional training that would be involved for creating new custom classifiers.

Without the filtering technique, an image can be recognized using a heavyweight model to achieve high accuracy, but with a long execution time. Using the filtering technique, the image can first be analyzed using a lightweight model as a filter to analyze an image in a shorter amount of time, and avoid the extra time of using the heavyweight model if a confidence value from the lightweight model. If the confidence from filtering with the lightweight model is high, the image recognition is complete. Otherwise, the image can be further analyzed using the heavyweight model (also referred to as a regular model). In various embodiments, most of the images being analyzed can be handled through filtering with the lightweight model, and only a small number of images will be passed on to the heavyweight/regular model. Therefore, the overall execution time will approach the execution time of the lightweight model, while the higher accuracy can be maintained by using the heavyweight model. In various embodiments, the filtering model achieves the balance between accuracy and execution time of lightweight and heavyweight models. The execution time can be similar to the faster model and the accuracy can be close to higher accuracy model.

In various embodiments, the accuracy delivered by the filtering technique/model can be even higher than either the lightweight or the heavyweight models alone, since the two models can be trained with different datasets, so each model may perform better for different data. The filtering technique will select the result with high confidence between both models and achieve better accuracy overall.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for applying lightweight and heavyweight neural networks to an input as a filtering model is illustratively depicted in accordance with one embodiment of the present invention.

In various embodiments, a filter model system receives images/video frames 120 from a camera 110 as input. An object detector 130 is used to detect objects in each of the captured video frames 120 to generates a set of preprocessed input images 140, where an object recognition model 150 can be applied to the preprocessed input images 140 to recognize the objects. In various embodiments, the object recognition model 150 generates the recognition results based on a confidence value and sends the image information to a data analyzer 160. The data analyzer 160 can further analyze the recognition information from the object recognition model 150. For example, if the object recognition model 150 generates the gender and age information for a face, the data analyzer 160 can count the numbers of females and males, so that the end-user can understand the customers' gender/demographics in a retail store. The end-user can view the results at a user interface/display 170. An example is the analysis of gender and age profiles of people captured by the camera. The gender and age profiles can be used for purchasing decisions and marketing decisions, where a purchasing manager can identify and stock the store with items directed to the demographic data obtained from the object recognition model 150 and data analyzer 160. The user can modify store inventory based on the identified gender and age information obtained from the recognition results and data analysis compared to market research and sales trends to increase the amount of faster selling goods that can be traced to the store demographics.

In a non-limiting exemplary embodiment, an object detector can be used to detect faces in an image, where the object detector can find all face images from the camera's input stream. An object recognizer can perform age and gender recognition to determine the age and gender information for each face. The age and gender recognition information can be used to analyze the trend of people appearing in the cameras, which can be used to plot graphs and figures for a user to identify demographics, for example, to identify markets and shifting purchasing trends by customers in real time. In various embodiments, purchasing quantities and targeted merchandise can be adjusted within each purchasing period as real time analysis shows changes in shopper demographics and inventory management. Store owners and purchasing managers can modify a store's inventory to reflect increases and decreases in daily, weekly, and monthly, buying trends in relation to shopper demographics. Demographic determinations using the object recognition model 150 and data analyzer 160 can identify a dominant customer group making up a customer base and related product demand and purchasing decisions.

In various embodiments, the object recognition part of the system can be optimized, where the object recognizer is developed based on a deep learning model. The deep learning model can be previously trained with multiple images to generate the neural network (NN) weights. In the image recognition process, an input image can be fed into the neural network and the NN weights can be applied to the image to obtain a recognition result with a confidence value. For example, if the input image is a face of a person, one of recognition result can be "male" with confidence value of 99%, which means the model tell us there are 99% chance that the image shows a male person.

The model used in the process can have very different computation requirements and accuracy of results. In the last few years, the deep models with the highest accuracy have become larger and more computationally intensive/demanding (i.e., heavier), and are used in most systems to obtain sufficient accuracy. Faster models can run in a very low computation environment, but can have a lower accuracy (e.g., confidence).

Figure 2:
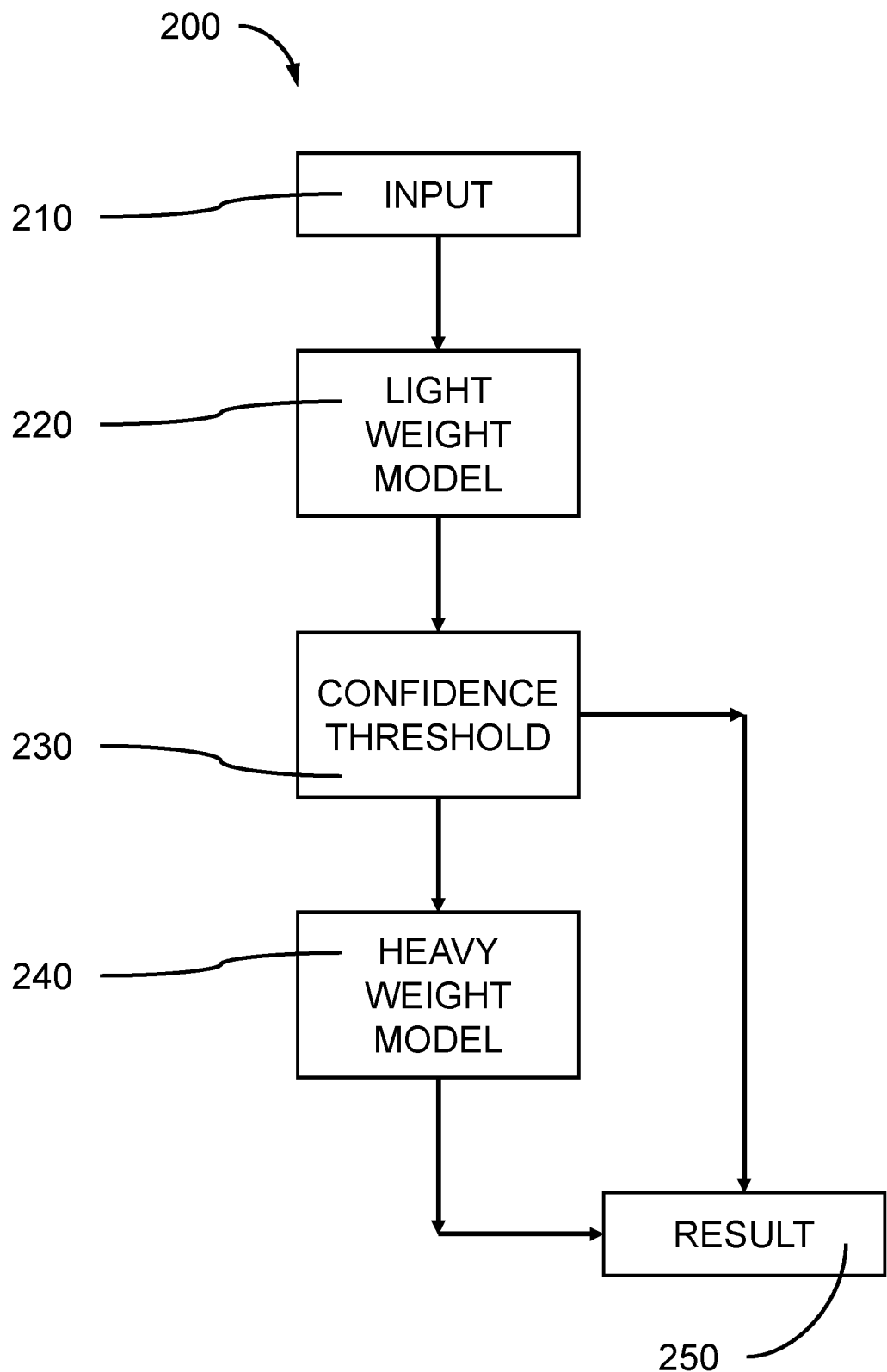
FIG. 2 is a block/flow diagram of a filtering technique using a lightweight model as a filter and a heavyweight model, in accordance with an embodiment of the present invention.

FIG. 2 is a block/flow diagram of a filtering technique using a lightweight model as a filter and a heavyweight model, in accordance with an embodiment of the present invention.

In various embodiments, two models can be used in a filter model system 200 for image recognition. The first model can be a filtering model that implements a lightweight model 220 for image recognition. The second model can be a heavyweight model 240 also for image recognition. The lightweight model 220 can receive one or more images 210 for analysis.

In various embodiments, the lightweight model 220 can be a convolutional neural network (CNN), including, but not limited to, Cifar10_quick, NECLA (age/gender model), MobileNet and Squeezenet, for edge/mobile devices, where, for example, Cifar10_quick has 145,500 trainable parameters, NECLA has 2.3 million trainable parameters, MobileNet-v1 has 4.2 million trainable parameters, MobileNet-v2 has 3.4 million trainable parameters, and SqueezeNet has 1.25 million trainable parameters.

In various embodiments, the heavyweight model 240 can be a CNN, including, but not limited to, NECLA, AlexNet, ResNet, or VGGnet, where, for example, VGG16 has a total of 138 million trainable parameters, AlexNet has 62.4 million trainable parameters, and ResNet18 has 11 million trainable parameters.

In various embodiments, the lightweight model 220 has a tenth or less of the trainable parameters than the heavyweight model 240 has, and we consider a model as a lightweight one if its parameter size is less than tenth of the parameters of a regular model.

In various embodiments, input is one or more images as shown in block 210. These images can be cropped from frames of video streams. A cropping algorithm based on a region of interest (ROI) is different from the objection detections. For example, a face detection algorithm can detect the faces in the video from a camera. In such as a case, the input of for the system is a set of facial images.

At block 220, a lightweight model can be applied to the input image for filtering, where the lightweight model is smaller and faster than the heavyweight model 240.

At block 230, the resulting confidence value generated by the lightweight model 220 can be compared to a predefined threshold value to determine whether the image recognizer is sufficiently accurate to provide a final result at block 250, or the image should be fed into the heavyweight model for a more accurate determination shown by a higher confidence value. The application of the lightweight model 220 can be utilized to filter out images that would not benefit from the more time-consuming and computationally intensive heavyweight model 240. For example, the lightweight model can be used to identify the gender information from an image of a person's face, where the lightweight model will generate one value for "male" and one value for "female" between 0%-100% indicating the likelihood (probability) that the face shown in the image is male versus female. The age classification gives the probability of age between 1-100. The gender detector gives the probability of either MALE or FEMALE.

In various embodiments, the filtering system 200 checks the confidence value of the output of the lightweight model, and compares it with a threshold value in the system. If the resulting confidence value is higher than the 'threshold' value, the filtering system considers the result from lightweight model to be sufficiently accurate, so the system generates the final output that can be displayed to a user and the image recognition is complete. If the confidence is less than the 'threshold', which means the lightweight model is not sure about the result, the input image is passed to the heavyweight model for processing.

At block 240, the heavyweight model processes the received input image, where the heavyweight model should generate a confidence value grater that the threshold value and greater than the lightweight model.

Since the input image 210 is processed by the heavyweight model 240 if the lightweight model 220 does not provide a result with a confidence value above the threshold value 230, the filtering system can provide suitably accurate results faster than if the image was input to the heavyweight model, which can be much slower compared to the lightweight model.

In various embodiments, the lightweight model can be about 25% to about 33% faster than the heavy model, or about 30% to about 33% faster.

In various embodiments, the threshold value can be set to a value equal to the average (mean) confidence value generated by the heavyweight model for a test set of images. For example, the threshold value can be set to 0.75 to differentiate between acceptable and unacceptable classifications/results. In various embodiments, the threshold value is either a predetermined value of 0.75, or can be set as a configuration parameter by a system administrator.

In various embodiments, the image recognition models take an image as an input, and generate a recognition result with a confidence value. The regular model can have a high accuracy but a long execution time, and the filtering model can have less accuracy but a shorter execution time. The system can use existing lightweight and heavyweight models, that don't need training or training data. The lightweight model first is used on all input images. The regular model is used on images when the filtering model cannot generate a confident result, so only a small number of images may need analysis by the heavyweight model. Therefore, the number of times both the lightweight model and heavyweight model have to execute for a single image is much less than the total number of images being analyzed. This can save time overall. In various embodiments, up to 33%, or between about 25% to about 33%, or about 30% to about 33% of an execution time can be saved.

In various embodiments, where the threshold value is set to a value at or close to the mean of the confidence of the heavyweight model, the overall accuracy can be equal to or greater than the results from just the heavyweight model, since the lightweight model can be more accurate for certain types of images.

Figure 3:
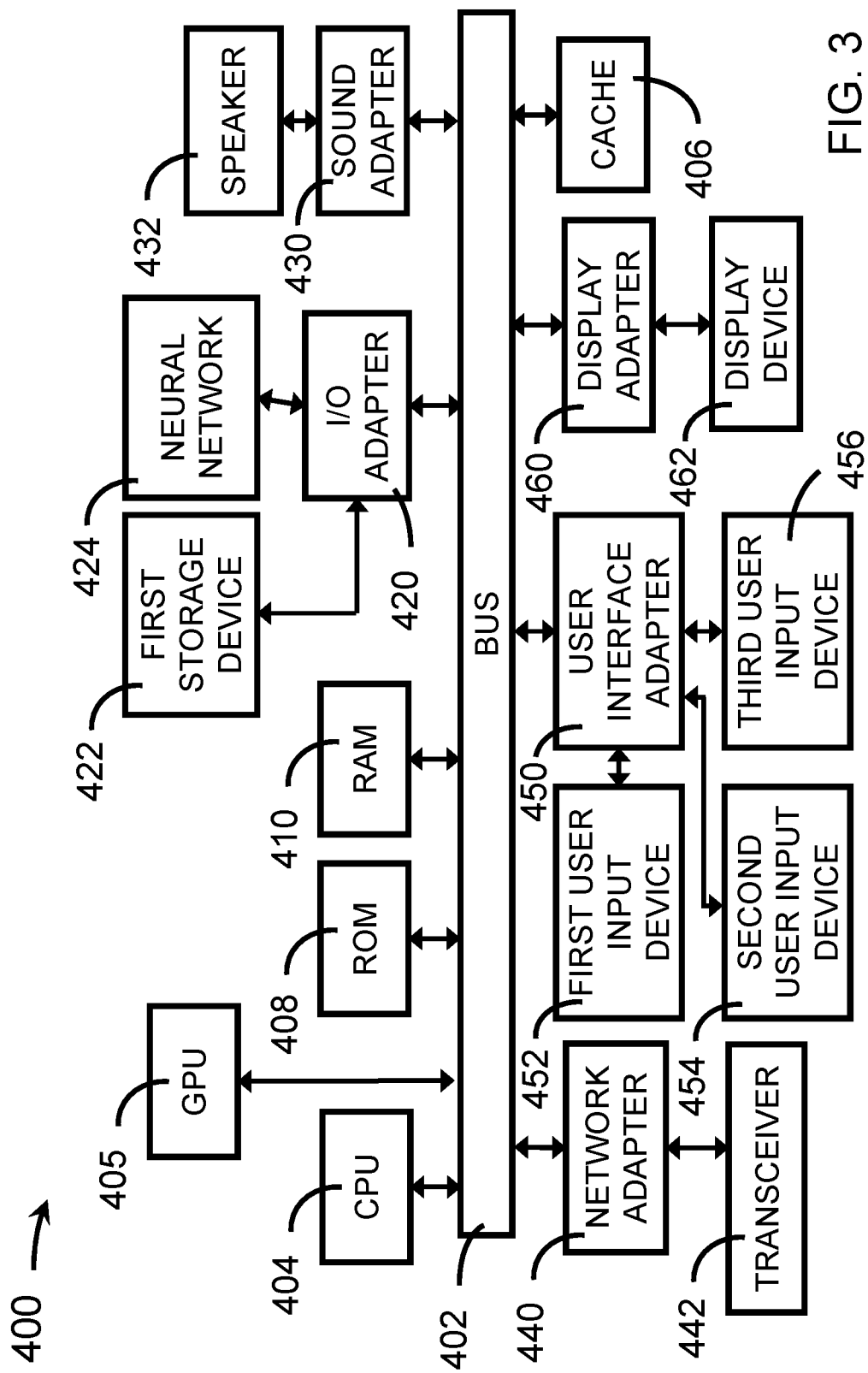
FIG. 3 is an exemplary processing system to which the present methods and systems may be applied, in accordance with an embodiment of the present invention.

FIG. 3 is an exemplary processing system 400 to which the present methods and systems may be applied, in accordance with an embodiment of the present invention.

The processing system 400 can include at least one processor (CPU) 404 and may have a graphics processing (GPU) 405 that can perform vector calculations/manipulations operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and/or a display adapter 460, can also be operatively coupled to the system bus 402.

A first storage device 422 and a second storage device 424 can be operatively coupled to system bus 402 by the I/O adapter 420, where a neural network can be stored for implementing the features described herein. The storage devices 422 and 424 can be any of a disk storage device (e.g., a magnetic or optical disk storage device), a solid state storage device, a magnetic storage device, and so forth. The storage devices 422 and 424 can be the same type of storage device or different types of storage devices.

A speaker 432 can be operatively coupled to the system bus 402 by the sound adapter 430. A transceiver 442 can be operatively coupled to the system bus 402 by the network adapter 440. A display device 462 can be operatively coupled to the system bus 402 by display adapter 460.

A first user input device 452, a second user input device 454, and a third user input device 456 can be operatively coupled to the system bus 402 by the user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 can be used to input and output information to and from the processing system 400.

In various embodiments, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that system 400 is a system for implementing respective embodiments of the present methods/systems. Part or all of processing system 400 may be implemented in one or more of the elements of FIGS. 1 and 2. Further, it is to be appreciated that processing system 400 may perform at least part of the methods described herein including, for example, at least part of the method of FIGS. 1 and 2.

Figure 4:
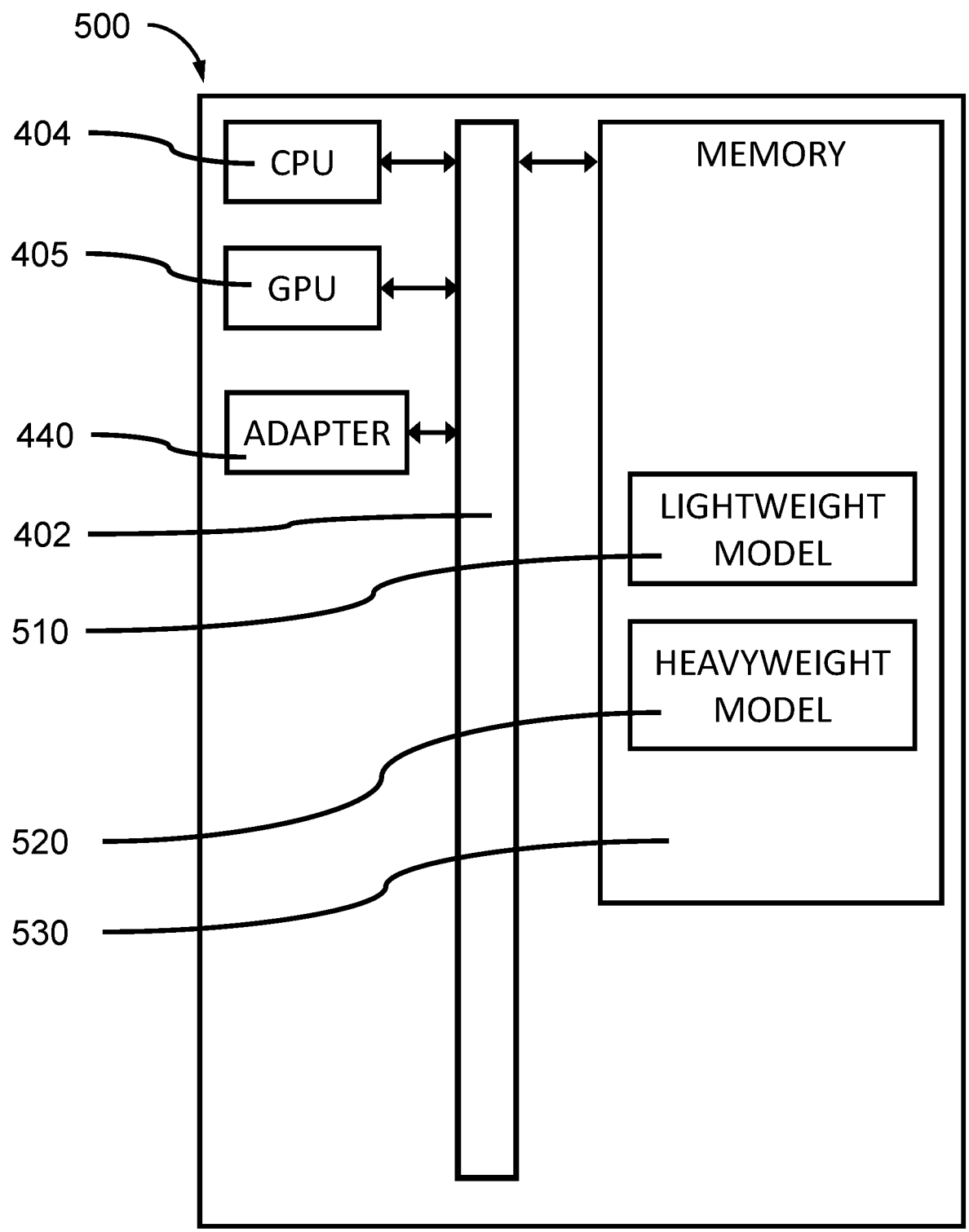
FIG. 4 is an exemplary processing system configured to implement one or more neural networks for demographic determination using image recognition, in accordance with an embodiment of the present invention.

FIG. 4 is an exemplary processing system configured to implement one or more neural networks for demographic determination using image recognition, in accordance with an embodiment of the present invention.

In one or more embodiments, the processing system 400 can be a computer system 500 configured to perform a computer implemented method of filtering images using a lightweight neural network model for filtering and a heavyweight neural network model, where the image filtering system can classify an image more accurately and faster than the lightweight and heavyweight models alone for a given dataset.

In one or more embodiments, the computer system 500 can be a processing system 400 having memory components 530, including, but not limited to, the computer system's random access memory (RAM) 410, hard drives 422, and/or cloud storage to store and implement a computer implemented method of analyzing and classifying images. The memory components 530 can also utilize a database for organizing the memory storage.

In various embodiments, the memory components 530 can include a lightweight model 510 that can be a neural network configured to perform image recognition quickly, where the lightweight model 510 can be convolutional neural network with a number of trainable parameters below one tenth the heavyweight model. The lightweight model 510 can be configured to receive as input an image dataset and classify the images according to two or more categories (e.g., age and gender).

In various embodiments, the memory components 580 can include a heavyweight model 520 that can be a neural network configured to perform image recognition more accurately but slower than the lightweight model 510. The heavyweight model 520 can be convolutional neural network with a number of trainable parameters above about 1 million, or above 2 million, or above 5 million, or above 10 million, whereas a lightweight model can be below about 5 million, or about 2 million, or about 1 million trainable parameters.

Figure 5:
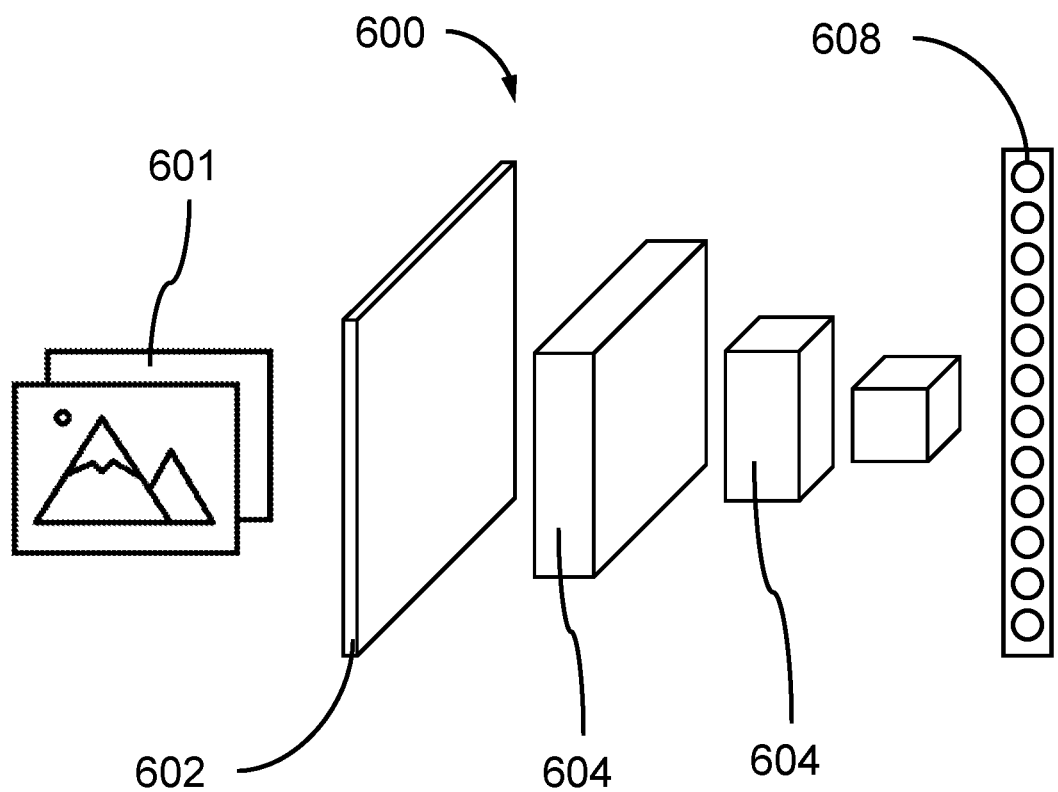
FIG. 5 is a block diagram illustratively depicting an exemplary convolutional neural network in accordance with another embodiment of the present invention.

FIG. 5 is a block diagram illustratively depicting an exemplary convolutional neural network in accordance with another embodiment of the present invention.

A convolutional neural network 600 may include a plurality of neurons/nodes that may communicate using one or more of a plurality of connections. The neural network 600 can be a convolutional type of neural network that can include a plurality of layers, including, for example, an input layer 602, one or more hidden layers 604, and an output layer 608, where the output layer has a number of nodes equal to the number of classification categories. In various embodiments, nodes within each layer may be employed to apply a function (e.g., summation, regularization, activation, etc.) to inputs from a previous layer to produce an output, and the hidden layer 604 may be employed to transform inputs from the input layer 602 into output at different levels. The number of nodes per layer 602, 604, 608 can depend on the number of inputs and type of output. An image 601 can be fed to the input layer, for example, as color values for each pixel.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for demographic determination using image recognition, comprising:
    analyzing an image with a pre-trained lightweight neural network model, where the lightweight neural network model generates a confidence value;
    comparing the confidence value to a threshold value to determine if the pre-trained lightweight neural network model is sufficiently accurate;
    analyzing the image with a pre-trained heavyweight neural network model for the confidence value below the threshold value, wherein the pre-trained heavyweight neural network model has above about one million trainable parameters and the pre-trained lightweight neural network model has a number of trainable parameters below one tenth the heavyweight model; and
    displaying demographic data to a user on a user interface, wherein the user modifies store inventory based on the demographic data.

2. The method as recited in claim 1, further comprising calculating the demographic data from a plurality of images.

3. The method as recited in claim 1, wherein the pre-trained lightweight neural network model and the pre-trained heavyweight neural network model are each a convolutional neural network.

4. The method as recited in claim 3, wherein the pre-trained lightweight neural network model is between 25% and 33% faster than the pre-trained heavyweight neural network model.

5. The method as recited in claim 1, wherein the threshold value is set equal to the average of confidence values generated for the pre-trained heavyweight neural network model using a training set of images.

6. The method as recited in claim 1, wherein the threshold value is 0.75.

7. A system for demographic determination using image recognition, comprising:
    a memory, wherein a pre-trained lightweight neural network model and a pre-trained heavyweight neural network model are stored in the memory;
    one or more processors configured to execute the pre-trained lightweight neural network model and the pre-trained heavyweight neural network model, wherein the pre-trained heavyweight neural network model has above about one million trainable parameters and the pre-trained lightweight neural network model has a number of trainable parameters below one tenth the heavyweight model, and compare a confidence value generated by the pre-trained lightweight neural network model to a threshold value, wherein the one or more processors are configured to execute the pre-trained heavyweight neural network model if the pre-trained lightweight neural network model is sufficiently accurate; and
    a user interface configured to display demographic data to a user, wherein the user modifies store inventory based on the demographic data.

8. The system as recited in claim 7, wherein the pre-trained lightweight neural network model has less than $1/10^{th}$ the trainable parameters than the pre-trained heavyweight neural network model.

9. The system as recited in claim 7, wherein the pre-trained lightweight neural network model and the pre-trained heavyweight neural network model are each a convolutional neural network.

10. The system as recited in claim 7, wherein the pre-trained lightweight neural network model is selected from the group consisting of Cifar10_quick, NECLA, MobileNet and Squeezenet.

11. The system as recited in claim 7, wherein the pre-trained lightweight neural network model is selected from the group consisting of NECLA, AlexNet, ResNet, and VGGnet.

12. The system as recited in claim 7, wherein the pre-trained lightweight neural network model is between 25% and 33% faster than the pre-trained heavyweight neural network model.

13. The system as recited in claim 7, wherein the threshold value is 0.75.

14. The system as recited in claim 7, wherein the threshold value is set equal to the average of confidence values generated for the pre-trained heavyweight neural network model using a training set of images.

15. A non-transitory computer readable storage medium comprising a computer readable program for demographic determination using image recognition, wherein the computer readable program when executed on a computer causes the computer to perform:
   analyzing an image with a pre-trained lightweight neural network model, where the lightweight neural network model generates a confidence value;
   comparing the confidence value to a threshold value to determine if the pre-trained lightweight neural network model is sufficiently accurate;
   analyzing the image with a pre-trained heavyweight neural network model for the confidence value below the threshold value, wherein the pre-trained heavyweight neural network model has above about one million trainable parameters and the pre-trained lightweight neural network model has a number of trainable parameters below one tenth the heavyweight model; and
   displaying demographic data to a user on a user interface, wherein the user modifies store inventory based on the demographic data.

16. The computer readable storage medium comprising a computer readable program, as recited in claim 15, further comprising calculating the demographic data from a plurality of images.

17. The computer readable storage medium comprising a computer readable program, as recited in claim 15, wherein the pre-trained lightweight neural network model and the pre-trained heavyweight neural network model are each a convolutional neural network.

18. The computer readable storage medium comprising a computer readable program, as recited in claim 17, wherein the pre-trained lightweight neural network model is between 25% and 33% faster than the pre-trained heavyweight neural network model.

19. The computer readable storage medium comprising a computer readable program, as recited in claim 15, wherein the threshold value is set equal to the average of confidence values generated for the pre-trained heavyweight neural network model using a training set of images.

20. The computer readable storage medium comprising a computer readable program, as recited in claim 15, wherein the threshold value is 0.75.

* * * * *